US008750249B2

(12) United States Patent
Sayeedi et al.

(10) Patent No.: US 8,750,249 B2
(45) Date of Patent: Jun. 10, 2014

(54) METHOD FOR CONSERVING RESOURCES DURING WIRELESS HANDOVER OF A DUAL MODE MOBILE STATION

(75) Inventors: Shahab M. Sayeedi, Naperville, IL (US); Wayne W. Ballantyne, Coconut Creek, FL (US)

(73) Assignee: Motorola Mobility LLC, Chicago, IL (US)

( * ) Notice: Subject to any disclaimer, the term of this patent is extended or adjusted under 35 U.S.C. 154(b) by 58 days.

(21) Appl. No.: 13/485,336

(22) Filed: May 31, 2012

(65) Prior Publication Data

US 2012/0236831 A1    Sep. 20, 2012

Related U.S. Application Data

(63) Continuation of application No. 12/774,106, filed on May 5, 2010, now Pat. No. 8,194,615.

(60) Provisional application No. 61/180,401, filed on May 21, 2009.

(51) Int. Cl.
*H04W 36/30* (2009.01)

(52) U.S. Cl.
USPC .......................................... 370/332; 455/436

(58) Field of Classification Search
USPC .................... 370/331, 332, 328, 329, 338; 455/435.1, 436
See application file for complete search history.

(56) References Cited

U.S. PATENT DOCUMENTS

| 7,280,505 | B2 | 10/2007 | Chaskar et al. |
| 7,590,092 | B2 | 9/2009 | Milton et al. |
| 7,751,816 | B2 | 7/2010 | Jung |
| 8,098,627 | B2 | 1/2012 | Dutta et al. |
| 8,260,299 | B2 | 9/2012 | Yokota |
| 2006/0276189 | A1 | 12/2006 | Kiernan et al. |
| 2006/0291419 | A1 | 12/2006 | McConnell et al. |

(Continued)

FOREIGN PATENT DOCUMENTS

| CN | 1812422 A | 8/2006 |
| JP | 2008236682 A | 10/2008 |

(Continued)

OTHER PUBLICATIONS

WiMAX Forum Network Working Group, "Annex: WiMAX— 3GPP2 Interworking Single Radio Transmitter/Dual Receiver", WiMAX Forum Proprietary, Feb. 2008, WiMAX Forum, all pages.

(Continued)

*Primary Examiner* — Brian D Nguyen

(57) ABSTRACT

A method is described that is for handing over a multi-mode mobile device from a first network technology to a second network technology. The method includes initiating by the multi-mode mobile device a first packet session in a first wireless network and detecting by a multi-mode mobile device a second wireless network supporting a different access network technology. The method also includes determining a Quality of Service requirement and completing pre-registration session establishment procedures for a second session in the second wireless network when the first session includes at least one of a QoS sensitive service and real time service by the first wireless network and mobile device and after completion of the pre-registration session establishment procedures the multi-mode mobile device receives service from the first wireless network and remains dormant on the second wireless network.

18 Claims, 4 Drawing Sheets

(56) References Cited

U.S. PATENT DOCUMENTS

| | | | |
|---|---|---|---|
| 2007/0153728 A1 | 7/2007 | Le et al. | |
| 2007/0189220 A1 | 8/2007 | Oberle et al. | |
| 2007/0204155 A1 | 8/2007 | Dutta et al. | |
| 2007/0249291 A1 | 10/2007 | Nanda et al. | |
| 2008/0198804 A1 | 8/2008 | Rahman et al. | |
| 2008/0207206 A1 | 8/2008 | Taniuchi et al. | |
| 2008/0254797 A1* | 10/2008 | Achtari et al. | 455/436 |
| 2008/0305796 A1 | 12/2008 | Dolan | |
| 2009/0017823 A1* | 1/2009 | Sachs et al. | 455/437 |
| 2009/0022104 A1 | 1/2009 | Cherian et al. | |
| 2009/0047963 A1* | 2/2009 | Kim | 455/438 |
| 2009/0161629 A1* | 6/2009 | Purkayastha et al. | 370/331 |
| 2009/0201879 A1* | 8/2009 | Purkayastha et al. | 370/331 |
| 2009/0207808 A1* | 8/2009 | McCann et al. | 370/331 |
| 2009/0280770 A1 | 11/2009 | Mahendran | |
| 2009/0290556 A1 | 11/2009 | Taaghol | |
| 2010/0208705 A1 | 8/2010 | Yokota | |
| 2010/0297996 A1 | 11/2010 | Yokota | |

FOREIGN PATENT DOCUMENTS

| | | | |
|---|---|---|---|
| KR | 20040073843 A | 8/2004 | |
| WO | 0038464 | 6/2000 | |
| WO | 2008129436 A2 | 10/2008 | |

OTHER PUBLICATIONS

WiMAX Forum Network Architecture—Stage 3—Annex: 3GP2—WiMAX Interworking—Release 1.1.2, Version 1.0.1, WiMAX Forum Network Architecture (Stage 3: Detailed Protocols and Procedures) [Annex: WiMAX—3GPP2 Interworking] NWG Approved, Release 1.5, Version 1.0.1, Sep. 8, 2008, all pages.

3GPP2 A.S0023-0, v1.0 Draft Version, Interoperability Specification (IOS) for High Rate Packet Data (HRPD) Radio Access Network Interfaces and Interworking with World Interoperability for Microwave Access (WiMAX), Nov. 2008, all pages.

3GPP, "3rd Generation Partnership Project; Technical Specification Group Services and System Aspects; Multi access PDN connectivity and IP flow mobility," 3GPP TR 23.861 v1.0.0, Mar. 2009, all pages.

Ashutosh Dutta1 Yoshihiro Obba 1 Kenichi Taniuchi 1 Henning Schulzrinne 1 Media-rndependent Pre-Authentication, MobOpt3 1 IETF,Mar. 8, 2005.

The State Intellectual Property Office of the People'S Republic of China, "Notification of the First Office Action" for Patent Application No. 201080021803.5 (BCS05733) dated Nov. 5, 2013, 12 pages.

3GPP TSG RAN2 #60, R2-075073 "Update of Stage 2 to incorporate Interworking with cdma2000" Nortel et al., Jeju, Korea, Nov. 5-9, 2007, 16 pages.

* cited by examiner

METHOD FOR CONSERVING RESOURCES DURING WIRELESS HANDOVER OF A DUAL MODE MOBILE STATION

RELATED APPLICATIONS

The present application is a continuation of U.S. patent application Ser. No. 12/774,106, filed May 5, 2012, and now U.S. Pat. No. 8,194,615, which claims priority to United States Provisional Patent Application have Application No. 61/180,401, filed May 21, 2009.

FIELD OF THE INVENTION

The present invention relates to intertechnology handover for multi-mode mobile devices and in particular for network entry and session establishment procedures initiated by multi-mode mobile devices prior to completing handover from a serving network to a target network, which uses a different wireless technology, based on Quality of Service requirements for services supported by the multi-mode mobile device.

BACKGROUND

Dual-technology wireless networks are becoming more prevalent as operators begin deploying 4G wireless broadband networks, such as LTE and WiMAX, in conjunction with their existing 2G and 3G networks which include GSM, cdma2000, HRPD, UMTS, etc. These dual-technology networks may be deployed in the form of 4G networks side by side with 2G/3G networks to extend the wireless operators' network coverage, as overlaying 4G networks over existing 2G/3G networks to add capacity in specific areas, or a combination of both. Some examples of dual-technology networks include LTE-HRPD, WiMAX-HRPD networks, WiMAX-GERAN/UTRAN networks, 3GPP2, WiMAX-WiFi networks, and others. They may also include dual-technology 4G networks such as joint WiMAX-LTE access networks.

In order to take advantage of the extended network coverage and network capacity dual technology networks offer, dual-technology mode/multi-technology mode mobile devices (MS) capable of supporting multiple air interface technologies are required. As dual-technology wireless networks are deployed, wireless network operators are looking for ways to provide session continuity to customers across their dual technology networks as is currently available with the single technology network using handovers. This requires inter-technology handover support in the multi-mode MS and the heterogeneous joint access networks. An inter-technology handover may become necessary due to deteriorating radio conditions at the serving technology network, load balancing between the heterogeneous networks, temporary service outage at the serving network, operator policy for dual mode MSs, user preference for service in one technology network vs. another e.g. due to higher bandwidth, lower cost, or other reasons.

A packet session supported by a serving network may be comprised of one or more 'service flows' or 'service instances' supporting one or more packet type services. These may include, for example, Quality of Service (QoS) sensitive applications such as video streaming, gaming, voice over IP (VoIP) and other real time services where latency delays cannot be tolerated, and applications such as email, web browsing, or instant messaging with low QoS requirements where latency delays can be tolerated with little impact to the user experience. Session continuity refers to the ability to maintain an existing packet data session during handover from a serving base station, access point or network node to a target base station, access point or network node that used different wireless access technology. In order to maintain session continuity of existing packet data sessions during user mobility, a user's packet session must be handed over from a current serving node to a target node. In the case of inter-technology handovers, the serving and target nodes involved in the handoff support two different air interface technologies or radio access types (RAT) and network standards or technologies. Hence, prior to the handover, a new session must first be setup and packet session established at the target network.

Call setup, initial network entry or session registration in a wireless network includes authentication, authorization, and packet session registration procedures between the mobile device and the network. Handover in homogenous technology networks use standardized handover signaling protocols to optimize moving a mobile device's packet session from a source or serving node to a target node. Because inter-technology handover signaling protocols are not specified, inter-technology handovers, i.e. handing over a packet data session from a serving technology network to a heterogeneous target technology network, require initial network entry procedures to be completed on the target network first before the packet session active between the mobile device and the serving node can be handed off to the second heterogeneous technology node.

Completion of initial network entry procedures at a target technology node at the time of inter-technology handover is time consuming and results in unacceptable latency delays and potential packet loss during the inter-technology handover. Depending on the air interface technology supported by the mobile device and target technology network, completion of initial network entry procedures can take several seconds to achieve. These delays are unacceptable when handing off a packet data session comprised of QoS sensitive real time services.

In order to minimize latency delays during inter-technology handover, a multi-technology mode mobile device in a dual or multi technology coverage area may initiate network entry procedures at a target technology network prior to inter-technology handover is actually required while continuing to receive packet data service from the serving technology network. A multi mode MS continues receiving packet data service via the serving network while communicating with the target technology network via air interface signaling native to the target technology network to complete initial network entry procedures and establish a new packet session. Hence, a packet session is established, and network resources to support the packet session are allocated and 'reserved' at the target technology network for the multi-mode mobile device until a handover is required. When an inter-technology handover becomes necessary or required, rather than having to complete the initial network entry procedures and packet session establishment at the target technology network at the time of inter-technology handover, the user's services are simply moved from the serving technology node to the pre-configured packet session at a target technology network node resulting in seamless session continuity during inter-technology handover and minimal data loss than otherwise possible.

A dual or multi-mode mobile device includes dual receiver circuitry allowing it to receive signals from two heterogeneous technology nodes at the same time. These mobile devices include dual transmitter circuitry enabling them to transmit to two target nodes or base stations configured to support two different air interface concurrently. They also include mobile devices with single transmitter circuitry in which case the mobile device communicates with the target technology node by 'piggybacking' or 'encapsulating' air interface signaling destined for the target network within signaling destined to its current serving network node. The serving network then forwards the mobile's air interface signaling to the target technology network via an inter-technology network interface between the serving and target networks.

Given the number of multi-mode devices that may be present at a given time within a target technology network's coverage area, particularly in an 'overlay' type network, the resources consumed at the target technology network to complete initial network entry procedures and packet session pre-establishment for potential inter-technology handovers from multi-mode mobile devices at a heterogeneous serving technology network may be significant. This results in degradation and deterioration of network performance in the target technology network since resources that may be allocated to potentially revenue generating mobile devices either active in the target technology network or actually handing over to the network are instead allocated to multi-mode mobile devices receiving service from another serving technology network that may handover to the target technology network at some time in the future or perhaps never at all.

Once initial network entry procedures are completed and a session is pre-established or reserved at the target technology network for an inter-technology handover that may occur in the future, there is no guarantee when the multi-mode mobile device will actually complete an incoming handover to the target technology network unless the handover is initiated by the network, hence the resources associated with maintaining the packet session may be allocated indefinitely. Thus, there is a need to be able to support seamless session continuity during inter-technology handovers while minimizing resource requirements at the target technology network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
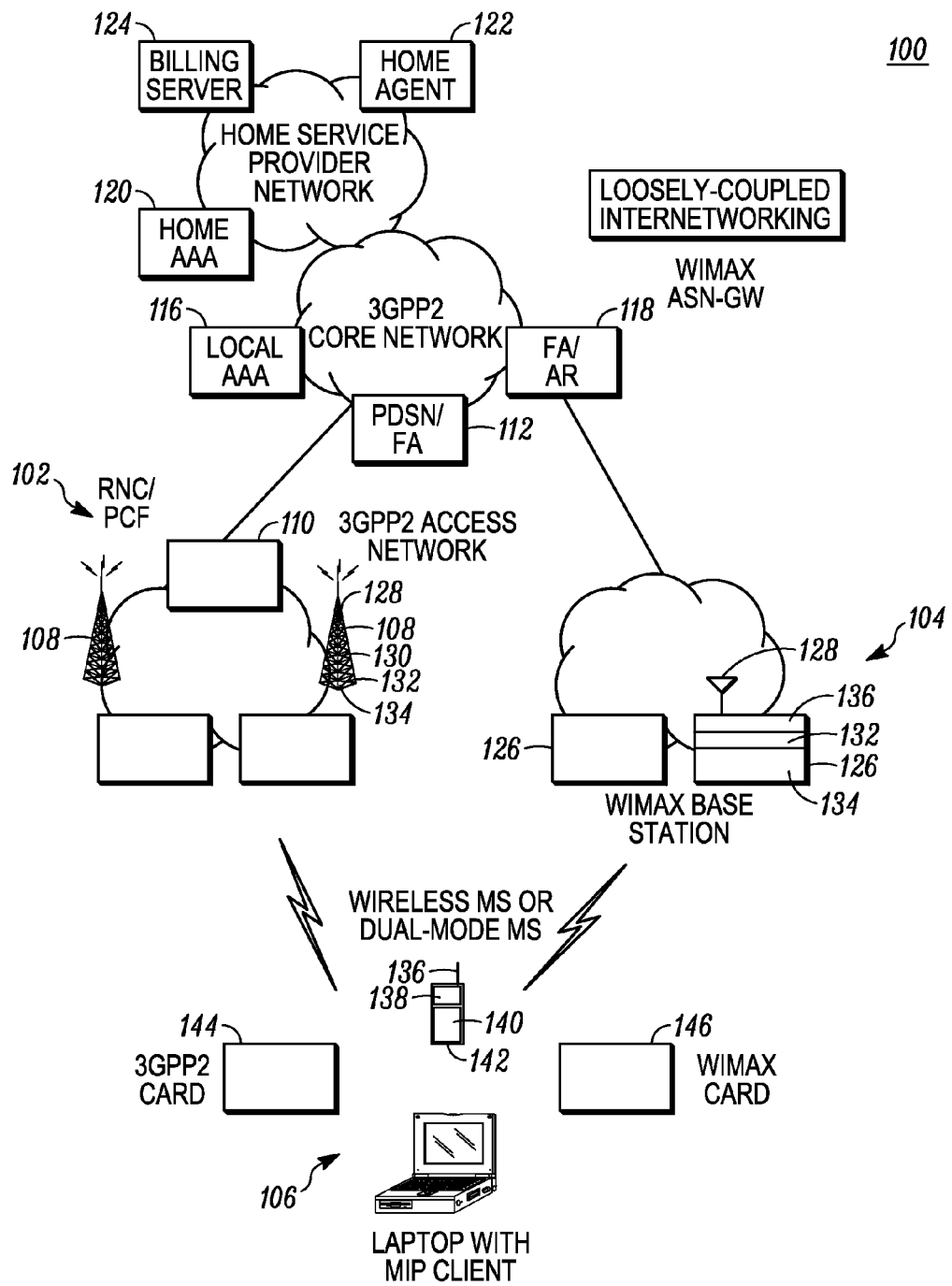
FIG. 1 is an example wireless communication system having dual wireless technology coverage in which embodiments of the invention operate.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method of conserving wireless resources during the handover of a multi-mode mobile device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the method of conserving wireless resources during the handover of a multi-mode mobile device described herein. The non-processor circuits may include, but are not limited to, a radio receiver, a radio transmitter, signal drivers, clock circuits, power source circuits, and user input devices. As such, these functions may be interpreted as steps of a method to perform the method of conserving wireless resources during the handover of a multi-mode mobile device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

According to the principles described, the present invention is directed to a method that includes initiating network entry and establishment of packet session services in a first session by a multi-mode mobile device. The first session supported by a source, serving, or first, wireless network in an area of dual or multi technology wireless coverage and provides packet data service to the multi-mode mobile device.

The multi mode mobile device detects a target, or second, wireless network in the area of multi-technology wireless coverage where the mobile device can operate in both the serving and target networks. The method continues by the multi mode mobile device determining the QoS requirements for its currently active services and currently being served by the serving technology network. When the packet service or services supported by the serving network and multi-mode mobile device include one or more QoS sensitive real-time services, the method continues with the multi mode mobile device initiating network entry and session establishment procedures for a second session in the target wireless network. Upon completion of initial network entry procedures and packet session establishment at the target technology network, the method continues with the multi mode mobile device continuing to receive service from the serving technology network while the second session at the target network remains dormant or idle so that it is not providing packet services to the multi-mode mobile device QoS sensitive real time packet services supported via the first packet session. The multi-mode mobile device can be handed over to the target technology network without requiring initial network entry procedures or packet session establishment to be completed at the target technology network, when inter-technology handover is required. The described method is applicable to multi mode mobile devices with dual mode transmitter circuitry or a single mode transmitter circuitry to operate in the first and second networks. In an embodiment, the multi-mode mobile device will be immediately handed over to the target network after the session initiation is completed if it is thereafter determined that the Quality of Service requirements for one or more services used by the mobile device are not QoS sensitive services or real time services.

In another embodiment, a method is disclosed where a network entity such as a base station or signaling forwarding function detects initial network entry signaling from a multi mode mobile device having a first packet session at a source, serving, or first, wireless network wherein the initial network entry signaling is for establishing second packet session at a target, or second, wireless network. The serving and target networks may be providing radio coverage in a common area of multi-technology wireless coverage. The method also includes determining if the initial network entry signaling from the multi-mode mobile device is for the purpose of packet session reservation at the target network for inter-technology handover while the multi-mode mobile device's first session is ongoing in the serving network. In addition, the method includes determining the QoS requirements for the packet services supported by the multi-mode mobile device and being served by the serving technology network. The target technology network will allow completion of network entry and packet session establishment for later inter-technology handover only if one or more of the packet services in use by the multi-mode mobile device and being served by the serving technology node include QoS sensitive real-time services. Moreover, the method includes rejecting the multi-mode mobile device's request for initial network entry and/or packet session establishment in response to initial network entry signaling and/or packet session establishment for the second session when there are no QoS sensitive services in use by the mobile device and supported by the serving technology network for the multi-mode mobile device. Depending on the air interface technology in use at the target technology node, determination of QoS requirements for the multi-mode mobile device services may be determined during initial network entry or packet session establishment procedures.

Turning now to FIG. 1 there is shown a block diagram of a multi-technology wireless coverage area for a wireless system 100 in which the principles described operate. The multi-technology wireless coverage area can include a first network 102 using a first wireless technology, such as a 2G/3G network, and a second network 104 using a second wireless technology, such as a 4G network like WiMAX. A multi-mode mobile device 106 operating within the system is constructed so that it can communicate using either the first or second networks 102, 104. As can be understood, either the 2G/3G network or the 4G network can operate as the serving network in which the mobile device 106 initially operates, and the 4G and the 2G/3G networks, respectively, can function as the target network for the mobile device.

The first, or 2G/3G, network 102 includes a number of base stations 108 that transmit and receive messages to and from the multi-mode mobile devices 106. As is known, the base stations 108 communicate with the radio network controller and packet control function 110 that, in an embodiment connects to the core network 112 via a packet data switch node/foreign agent (PDSN/FA). In addition to the PDSN/FA, the core network 112 includes a local authentication/authorization/accounting (AAA) node 116, foreign agent 118 and other necessary components for the operation of the network 102/112. In addition, the system 100 can encompass a home service provider network that includes a home AAA node 120, home agent 122 and billing server 124, which operate in known manners.

The second, or 4G, network 104 can include base stations 126, which can be WiMAX base stations or other nodes such as eNode Bs, access points (APs) and the like. The base stations 126 connect into the core network 112 through the foreign agent/routing agent (FA/RA) 118.

The base stations 108, 126 include the necessary components to operate in the 2G/3G or 4G networks, respectively, and include antennas 128, processors 130, memories 132 and transceivers 134 in known configurations.

Multi-mode mobile device 106, which can be a cell phone, smartphone, lap top computer or other similar portable device, also includes the necessary components to operate in the 2G/3G or 4G networks 102, 104. The mobile device includes an antenna 136, processor 138, memory 140 and transceiver 142. To operate in both the first and second network the mobile device may include circuitry supporting either a dual receive/dual transmit transceiver or a dual receiver/single transmit transceiver. In addition, the multi-mode mobile device may include the necessary 2G/3G card 144 and the 4G card 146 such as a WiMAX card.

Figure 1A:
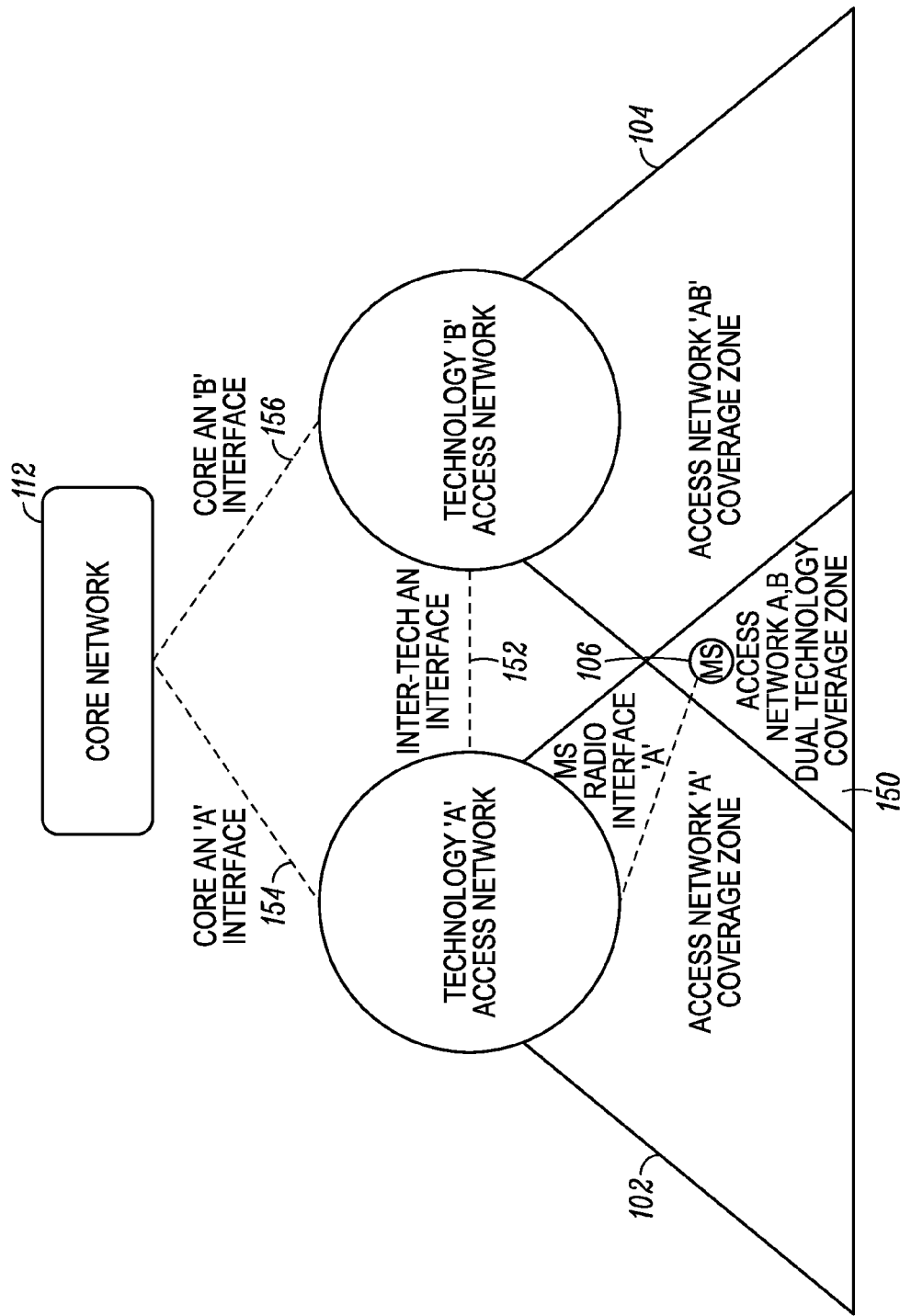
FIG. 1a is an example of a dual technology access network having an overlay of networks using different technologies in which embodiments of the invention operate.

FIG. 1a is an illustration of a configuration of the first network 102, second network 104 and core network 112 in which the multi-mode mobile station 106 operates. As seen, the arrangement of the service area for first network 102 and the service area for the second network are such that an overlay area 150 is provided. In the overlay area 150, mobile station 106 can operate using either the first network 102 or the second network. In addition, FIG. 1a shows that there are interfaces provided between the various networks. Accordingly, interface 152 is provided so that the wireless technology in the first network can communicate with wireless technology in the second network. Interface 154 is provided so that the first network can communicate with the core network 112, and interface 156 is provided so that the second network can communicate with the core network 112.

While multi-mode mobile devices 106 may be used to simultaneously receive services from two technology heterogeneous networks 102, 104, e.g. video service from a 4G network and VoIP (voice over IP) service from the 3G network, in the overlay area 150, their primary advantage is the ability to perform seamless handovers between dual technology wireless networks without requiring changes to previously deployed wireless networks for inter-technology handover support. A dual receive/dual transmit transceiver 142, upon detecting the need to perform a handover to a target network, initiates a network entry and packet session establishment at the target technology network while concurrently receiving and transmitting radio signals and receiving service from its serving technology network. Once network entry and packet session establishment is completed at the target technology network, the mobile device 106 performs a handover from the serving technology wireless network to the target technology wireless network when required.

Multi mode dual receive/single transmit transceiver 142 is also capable of providing inter-technology handover support. A single transmitter multi mode device can only transmit on a single air interface technology at a time and cannot 'time share' between the two networks 102, 104 for transmission. In order to establish a packet data session and session on the target technology network, the mobile device 106 transmits signaling for the target network by encapsulating or 'piggybacking' it onto native air interface signaling on the serving network. This is known as tunneling and requires a signaling link between the two networks to transfer signaling from the multi mode single transmitter device over to the target technology network. For tunneling, a common IP core is used such that a Policy and Charging Rules Function, Home Agent/Local Mobility Anchor, and AAA support both the 2G/3G network and the 4G network. The multi-mode mobile device 106 is also capable of being supported in both networks. A Signaling Forwarding Function (SFF) is a logical entity that provides tunneling support for the mobile device between two heterogeneous access networks. The SFF allows the multi-mode mobile device to operate in the first technology network and also communicate with second technology networks via an air interface supported by the second network to communicate with base stations and access nodes using native air interface signaling sent as encapsulated payload in IP packets over the inter-RAN interface thereby providing an interworking function for the 2G/3G or 4G network. The SFF may be collocated in the access network or may be a standalone entity.

The advantage of supporting inter-technology handover with single transmitter devices is that they cost less than dual transceiver devices while still being able to support inter-technology handovers. They also do not suffer from battery capacity and peak current issues since they only transmit on a single technology at a time.

The multi-mode mobile devices 106 described can provide seamless session continuity between serving and target networks such as the 2G/3G and 4G networks 102, 104. Seamless session continuity facilitates handovers with low latency delays and minimal packet loss, and is necessary for real-time QoS sensitive applications. In order to ensure seamless session continuity during inter-technology handover, a new call and packet session may be pre-established for the mobile device 106 at the target technology network while continuing packet services associated with the existing packet data session on the serving technology network. When an inter-technology handover becomes necessary, the packet session associated with the multi-mode mobile device at the serving network is then moved or 'handed off' to the pre-registered packet session at the target technology network thereby minimizing latency delays which would have occurred if a new call and session had to be established at the time of the handover. Therefore completing call setup and packet session prior to the handover taking place helps reduce latency delays and minimize packet loss during handover.

Pre-registration by establishing a call (initial network entry) and packet session on a wireless network requires authentication, authorization, and registration procedures to be completed. This requires processing resources to be allocated to the call or session. Once the call or session is established, resources must be allocated to the call, e.g. authentication context, call context, packet context etc, to maintain the call. This is required for all multi-mode devices in an area of dual technology or border coverage because otherwise the handover latency would be unacceptable for a real time service such as VoIP or real time streaming video.

Pre-registration using initial network entry and packet session establishment is beneficial to minimize latency delays during inter-technology handover for QoS sensitive services such as VoIP and streaming video. Pre-registration, however, is not so necessary for services with low QoS requirements such as email, instant messaging, file downloads, texting, etc, because these services can easily tolerate delays without serious degradation in service or user experience. Thus, it is more important to provide call setup and pre-registration with a target network if there are QoS sensitive or real-time services such as VoIP, video, or gaming being supported by the user's packet session in the serving network. If the user's session supports non-real time sensitive services with low QoS requirements, early call setup and session pre-registration at a target technology network does not necessarily need to be performed and can be deferred until an inter-technology handover becomes necessary for any reason such as deteriorating radio conditions at the serving technology network or network instruction to perform inter-technology handover. Since a large number of dual mode devices may be present in a dual technology coverage area at any given time, deferring network entry and session pre-registration at potential target technology networks until a handover is required for such devices with no active real time services can reduce the processing load and resource requirements at the target technology network. This will free up resources and make them available for supporting revenue generating calls.

Figure 2:
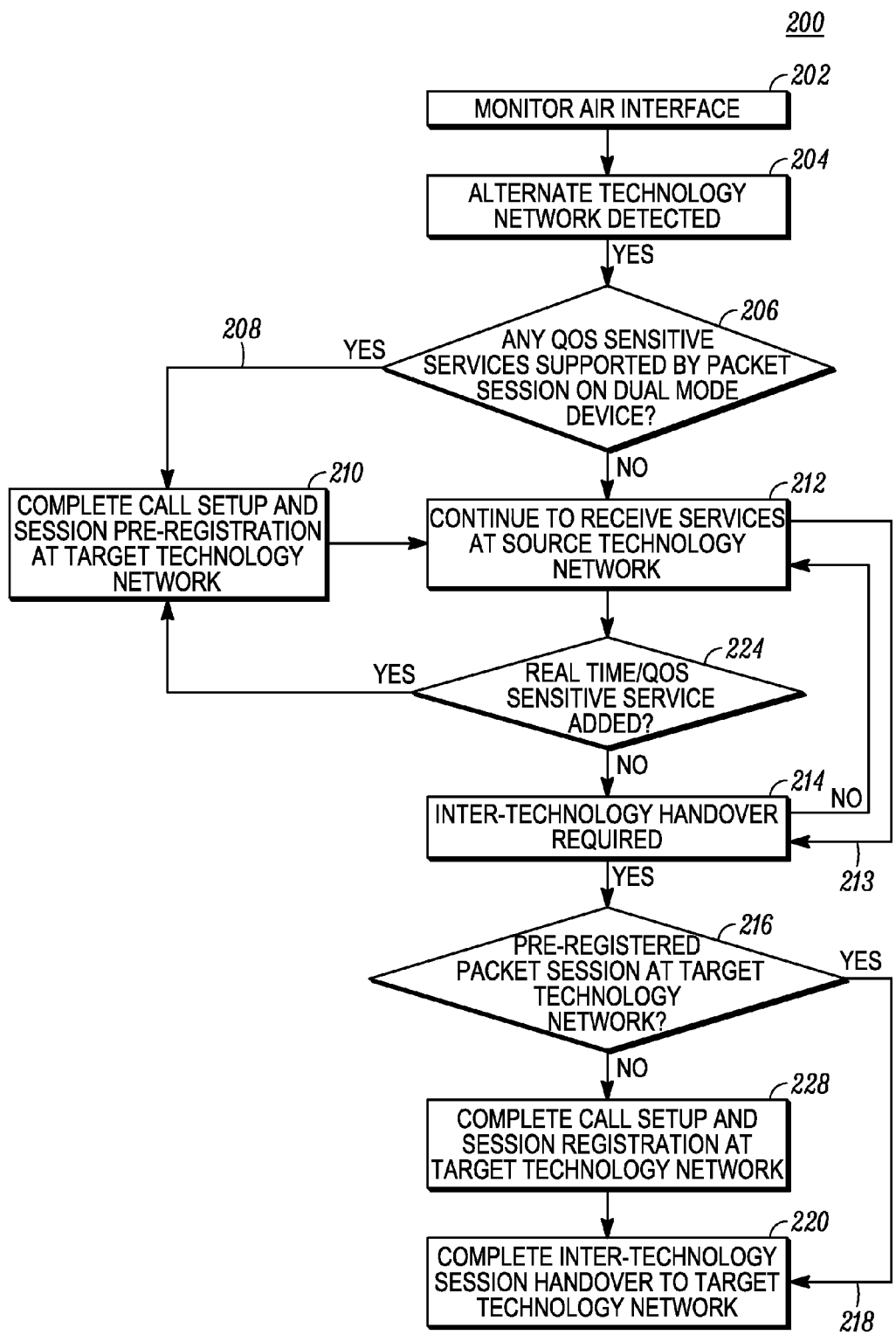
FIG. 2 is a flow chart of the method of multi-mode mobile device operating in accordance with some embodiments of the invention.

FIG. 2 is a flow chart showing the operation of a multi-mode mobile device 106 that is operating to complete initial network entry and packet session establishment operations with a target network in a dual technology network. The multi-mode mobile device 106 has a current call or packet session on the serving network. It is understood that the serving network can be either the 2G/3G packet network or a 4G network, but for this example the serving network will be considered the 2G/3G network 102 and a target network within the dual technology coverage area will be considered a 4G network 104. The mobile device 106 continues to monitor 202 the air interface to determine if the alternate network is available. At some point, the 4G network will be detected 204. When the alternative technology network is detected or discovered, the mobile device determines if it is going to complete initial network entry procedures with the target network to establish a packet session in the target technology network.

As described above, one criteria for the mobile device to consider before conducting network entry are the Quality of Service requirements for the connection. Thus, the mobile device determines 206 the Quality of Service requirements for packet services it is currently receiving for the current packet session via the serving network. If the Quality of Service requirements indicate that the current session includes one or more QoS sensitive or real-time services, the mobile device proceeds along path 208. Because of the Quality of Service level so indicates, the mobile device initiate 210 initial network entry and session establishment/pre-registration procedures with the target network, which in this case is the 4G network. After completing initial network entry and pre-registration/session/establishment procedures, the mobile device 106 continues 212 to receive packet service from the serving network without receiving packet services from the target network. Therefore, the second session at the target network remains dormant or idle so that it is not providing packet services to the multi-mode mobile device QoS sensitive real time packet services supported via the first packet session. This state continues along path 213 until the multi-mode mobile device determines 214 that inter-technology handover is required from the serving network to the target network. There can be many known reasons that such an inter-technology handover is necessary, such as unacceptable signal margin in the serving network. At such time, the mobile device 106 determines 216 if is initial network entry procedures and session establishment/pre-registration has been completed. If so, the mobile device continues on path 218 and completes 220 the inter-technology handover from the serving network to the target network without having to complete network entry and session registration/establishment procedures.

Returning to step 206, the multi-mode mobile device 106 determines that none of its services currently supported at the serving network are QoS sensitive or have real-time requirements and the mobile device proceeds along path 222 to step 212 where it continues to receive packet service from the serving network 102. At some point, a real-time or QoS sensitive service may be added to the mobile device's packet session 224 while operating on the serving network 102. After a QoS sensitive services or real time services are added, the process returns to step 210 where the mobile device can complete network entry procedures and session pre-registration for inter-technology handover to the target network 104. The mobile device will then have completed initial network entry procedures and session establishment prior to when it detects, in step 214, that inter-technology handover is required. Returning to step 216, the multi-mode mobile device 106 can determine that session setup has not been performed and that there is no session pre-registration with the target network 104. The mobile device therefore proceeds along path 226 to complete 228 the call setup/network entry and session establishment/registration procedures for session with the target network. Once these operations are complete, the mobile device proceeds to step 220 where it completes the handover to the target network. As can be seen the handover to the target network is completed after the multi-mode mobile device detects that the handover is required. In those situations where the original call or session is for QoS sensitive or real-time sessions, the call setup and pre-registration for the second session in the target network is initiated in advance, but the call setup for the second session in less sensitive or non-real-time sessions is delayed until the time of handover from the serving network to the target network. In an alternate embodiment, upon detecting an alternate technology network by the mobile device step 204 while in a dual coverage zone, it is possible to complete initial network entry and session establishment procedures at target technology 210 without considering if there are any QoS sensitive services supported for the multi-mode mobile device step 206. After session establishment inter-technology handover is completed to target technology network in step 220. Thus, resources used to support multi-mode mobile device's packet in serving technology network are immediately freed up depending on the presence or absence of QoS sensitive services supported by the multi-mode mobile device . . . .

Figure 3:
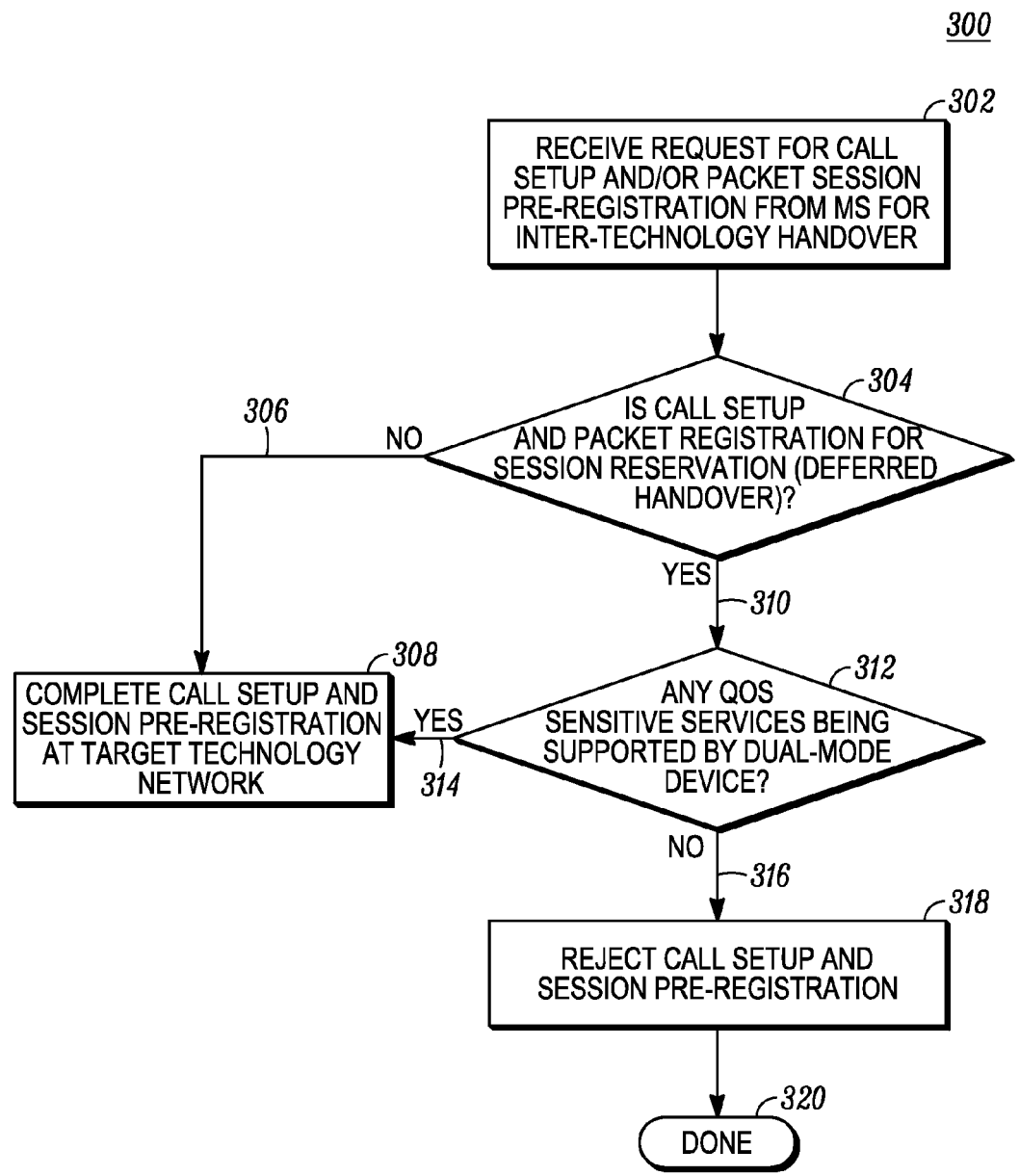
FIG. 3 is a flow chart of the method of a base station operating in accordance with some embodiments of the invention.

FIG. 3 is a flow chart 300 showing the operation of the base station 126 or other network entity in the target network that controls the handover that is operating as a part of call set up and registration in a dual technology coverage area's target network 104 for a multi-mode mobile device 106. Periodically, the entity in the target network 104 will receive 302 requests for call setup/network entry and packet session establishment/pre-registration for a multi-mode mobile device 106 for inter-technology handover purposes. The requests can be received directly from the multi-mode mobile device 106 that is operating in a serving network 102 or from the base station 108 or other network work entity within the serving network via an inter-network interface in response to air interface signaling received by the serving network from the mobile device 106. The target network 104 determines 304 if the call setup requests are for a deferred inter-technology handover and pre-registration for a session in the target network 104. If it is not for the purpose of a deferred inter-technology handover, the target network 104 proceeds along path 306 and begins network entry and session establishment/pre-registration procedures at the target network. In addition, the target network 104 can complete the handover to the target network at the appropriate time.

If the target network entity determines that the call setup and registration request is for a deferred inter-technology handover, the target network entity proceeds along path 310 to determine 312 if any QoS sensitive real-time services currently exist for the mobile's packet session. If so, the base station proceeds along path 314 to complete the initial network entry and session setup/session pre-registration procedures in step 308. On the other hand, if the base station determines that there are no QoS sensitive real time serves, the base station 126 proceeds along path 316 and rejects 318 the network entry and session pre-registration.

In the embodiments shown in FIGS. 2 and 3, the mobile device 106 and target network 104 that are determining the QoS requirements for mobile devices services being supported for the current session in the serving network and the second session in the target network, can use various methods to determine if the call setup and pre-registration procedures should be completed. For example, a threshold Quality of Service can be set and if the required Quality of Services is greater than the threshold the call setup or pre-registration can be completed for the target network. If the QoS is less then the threshold, no call setup or pre-registration need be completed.

According to the description above there is a method for determining whether to complete initial network entry and session establishment/pre-registration at a target technology network for inter-technology handover depending on the presence of QoS sensitive services or applications. If no QoS sensitive real-time services are active on the dual-mode device, network entry and session pre-registration shall not be completed at the target technology network for inter-technology handover purposes. The decision to defer network entry and session establishment/pre-registration for inter-technology handover based on the QoS requirements of the services currently being supported by the dual-mode device can be made at the MS or the network, as shown in the two exemplary embodiments described below. Otherwise, the network entry and session establishment/pre-registration is completed for the multi-mode mobile device to operate in the target network for when handover is required.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
   initiating by a multi-mode mobile device a service in a first session in a first wireless network;
   detecting by the multi-mode mobile device a second wireless network supporting a different access network technology than the first wireless network;
   determining a Quality of Service requirement for a service supported by the multi-mode mobile device, and
   completing pre-registration session establishment procedures by the multi-mode mobile device for a second session in the second wireless network for inter-technology handover when the determined service supported by the multi-mode mobile device includes at least one of a QoS sensitive service and real time service by the first wireless network and the multi-mode mobile device wherein after completion of the pre-registration session establishment procedures the multi-mode mobile device receives service from the first wireless network and remains dormant on the second wireless network.

2. The method of claim 1 further comprising not completing session establishment procedures by the multi-mode mobile device for the second session in the second wireless network when the determined service supported by the multi-mode mobile device does not include at least one of a QoS sensitive service and real time service.

3. The method of claim 1 further comprising completing session pre-registration procedures by the multi mode mobile device at the second wireless network when the mobile device is supporting a Quality of Service sensitive service or real-time service.

4. The method of claim 1 further comprising maintaining the first session and the second session until handover is required.

5. The method of claim 1 further comprising handing over the first session to the second session when handover is required.

6. The method of claim 1 wherein the multi-mode mobile device has a dual mode transceiver to operate in the first and second networks.

7. The method of claim 1 wherein the multi-mode mobile device has a single mode transceiver to operate in the first and second networks.

8. The method of claim 1 wherein initiating call setup procedures by the multi-mode mobile device for the second session uses a tunnel between the first network and the second network.

9. The method of claim 1 further comprising completing network entry and session establishment procedures by the multi-mode mobile device for the second session in the second wireless network when no Quality of Service sensitive services for the first session are determined and handover becomes necessary.

10. A method comprising:
    receiving a initial network entry signaling from a multi mode mobile device having a first session in a first wireless network wherein a session establishment is for a second session in a second wireless network supporting a different access network technology from the first network;
    determining if session establishment procedures for the second session is for deferred inter-technology handover to the second network while the multi mode mobile device has the first session ongoing in the first network;
    determining a Quality of Service requirements for a service supported by the multi-mode mobile device if the second session is for the deferred inter-technology handover, and
    completing the session establishment procedures for the second session when the determined service supported by the multi-mode mobile device includes at least one of QoS sensitive services and real-time services for the first session wherein after completion of the session establishment procedures the multi-mode mobile device receives service from the first wireless network and remains dormant on the second wireless network.

11. The method of claim 10 further comprising not completing session establishment procedures for the second session when the determined service supported by the multi-mode mobile device does not include at least one of QoS sensitive services and real-time services.

12. The method of claim 10 further comprising receiving a session-registration request for the second session from the multi mode mobile device.

13. The method of claim 10 further comprising rejecting the session establishment to the multi mode mobile station in response to a session establishment request for the second session when the Quality of Service requirements for the first session indicates that the Quality of Service requirements of the first session are not for sensitive real-time services.

14. The method of claim 10 further comprising handing over the multi-mode mobile device to the second session.

15. An apparatus comprising:
    a transceiver for transmitting and receiving messages and
    a processor coupled to the transceiver wherein the processor is configured to initiate a first session for a multi-mode mobile device in a first wireless network, determine that the multi-mode mobile device is supported by a second wireless network that uses a different access network from the first wireless network, determine the Quality of Service for the first session and initiate network entry procedures for a second session for the multi-mode mobile device in the second network when the determined Quality of Service indicates that the first session is one of a Quality of Service sensitive service and a real time service for the first session wherein after completion of the network entry procedures the multi-mode mobile device receives service from the first wireless network and remains dormant on the second wireless network.

16. The apparatus of claim 15 wherein the transceiver is a dual receiver and dual transmitter transceiver.

17. The apparatus of claim 15 wherein the transceiver is a dual receiver and single transmitter transceiver.

18. The apparatus of claim 15 wherein the processor is configured to further initiate session registration procedures for the second session when the Quality of Service is determined to be one of the Quality of Service sensitive session and a real time session.

* * * * *